April 21, 1931. C. T. STEVENS 1,801,373
WINDSHIELD WIPER
Filed Nov. 2, 1928
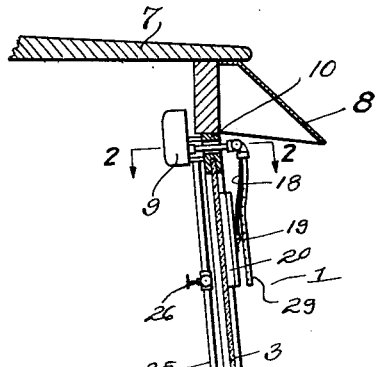
Fig. 1
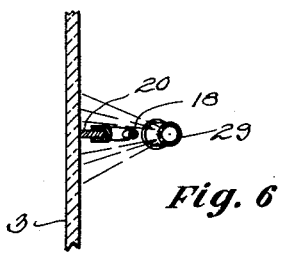
Fig. 6
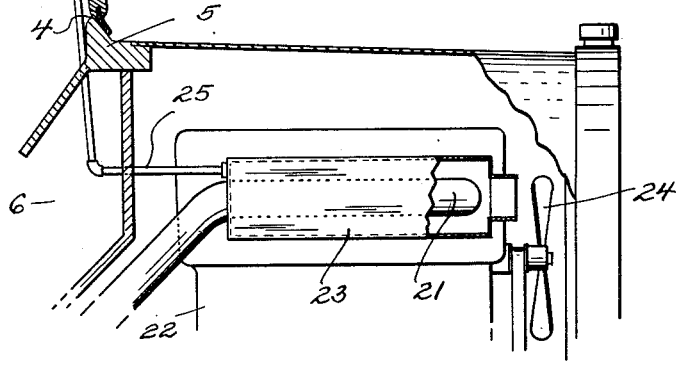
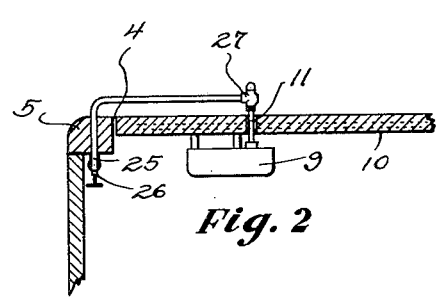
Fig. 2
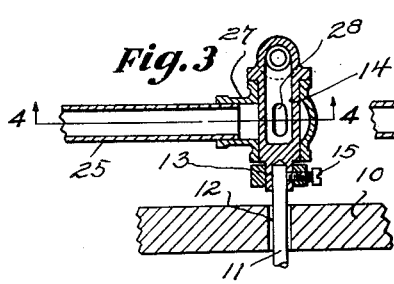
Fig. 3  Fig. 4
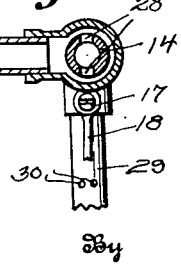
Fig. 5
Inventor
C. T. Stevens
By W. S. McDowell
Attorney Patented Apr. 21, 1931

1,801,373

UNITED STATES PATENT OFFICE

CARROLL T. STEVENS, OF COLUMBUS, OHIO

WINDSHIELD WIPER

Application filed November 2, 1928. Serial No. 316,850.

This invention relates to improvements in windshield wiping devices which are used in connection with motor vehicles for the purpose of removing moisture and other accumulations from the exposed surface of a windshield panel, in order that the driver of the vehicle may obtain a clear view through the windshield during periods of inclement weather.

The ordinary windshield wiper now in general use exerts but little effort and is of no practical value in removing snow, frost, sleet and other relatively heavier accumulations from the transparent panel of the windshield. The conventional wiper, as stated, is quite satisfactory when operated for the purpose of removing rain or liquids but the heavier accumulations are not so well handled. It is therefore an object of the present invention to provide in connection with a windshield wiper means whereby the wiper is rendered highly effective in removing snow, frost and the like from a windshield.

Another object of the invention resides in the provision of a windshield wiper with a perforated tubular member which is arranged to oscillate or move in unison with the squeegee of the wiper and to provide means for circulating a heated fluid through said conduit, whereby on the operation of the device the heated fluid may be sprayed or jetted upon the exposed surface of the windshield to lessen and melt the frost or snow accumulations to permit of the subsequent removal thereof by the action of the oscillating rubber blade or squeegee.

It is a further object of the invention to provide means whereby the attachment for delivering the heated fluid to the wiper may be removed from the latter when not needed.

A still further object resides in the provision of a heater casing for delivering the desired quantities of heated fluid to the wiper and also the provision of means for controlling the supply of the heated fluid delivered to the wiper from the casing.

It is a further object of the invention to provide a wiper of the character set forth of simple but practical formation, one which will not interfere with the vision of the vehicle operator and which possesses the advantage of being economically manufactured and convenient to install upon a motor vehicle.

With these and other objects in view which will appear as the description proceeds, the invention consists in the novel features of construction, combinations of elements and arrangements of parts hereinafter to be fully described and pointed out in the appended claims.

In the accompanying drawings:

Figure 1 is a vertical sectional view taken through a motor vehicle provided with the windshield wiping attachment comprising the present invention, Figure 2 is a horizontal sectional view on the plane indicated by the line 2—2 of Figure 1, Figure 3 is a horizontal sectional view on an enlarged scale showing the swiveled union between the gas supply conduit for delivering heated fluid to the attachment and the motor shaft, Figure 4 is a vertical sectioal view on the plane indicated by the line 4—4 of Figure 3, Figure 5 is an enlarged vertical sectional view taken through the attachment disclosing more particularly the perforated conduit, the swiveled supporting union and the squeegee element, Figure 6 is a horizontal sectional view taken on the plane indicated by the line 6—6 of Figure 5.

Referring more particularly to the drawings, the numeral 1 designates the windshield of a motor vehicle which consists of the customary frame 2 and a transparent panel 3, the windshield being adjustably mounted by any suitable means, not shown, within an opening 4 provided in connection with the body frame 5 of the motor vehicle 6. The top of the vehicle is indicated by the numeral 7 and the sun visor by the numeral 8.

The improved windshield wiper comprising the present invention consists in its preferred form of an electric motor 9 mounted in connection with the upper rail 10 of the frame 2. The shaft 11 of the motor 9 extends through a bearing opening 12 formed in the rail 10. The outer end of the shaft 11 is received within a bore 13 formed in the inner end of an oscillating sleeve 14, the sleeve 14 being secured to the shaft 11 by a set screw or its equivalent 15, whereby upon the oscillation of the shaft 11 the sleeve 14 will move in unison therewith. The outer end of the sleeve 14 terminates in a downwardly extending nipple 16 to which is secured, as at 17, the upper end of an arm 18. To the lower end of this arm there is pivotally connected as at 19 a wiping blade or squeegee element 20. This member is of standard construction and operation and engages, as usual, with the exposed surface of the transparent panel 3. It will be seen that when the motor 9 is operated its shaft together with the sleeve 14 oscillate back and forth and carry with them the squeegee element 20. Since this element frictionally engages the exposed surface of the panel 3, moisture accumulations upon said panel will be removed in the ordinary manner.

The squeegee element, however, of itself is not particularly effective in the matter of removing more solid encrustations such as sleet, snow and frost and the present invention resides chiefly in the provision of a construction for permitting this to be accomplished. One of the preferred embodiments of the invention consists in surrounding the exhaust manifold 21 of the engine motor 22 with a sheet metal casing 23. The forward end of this casing opens to the atmosphere and is situated in registration with the air circulating fan 24 of said engine, in order that when the engine is in operation, which results in the rotation of the fan 24, forced currents of air will be moved through the casing 23 and brought into contact with the heated surface of the exhaust manifold 21 so as to quickly and effectively raise the temperature of the air thus introduced into the casing.

This heated air passes from the casing by way of a pipe line 25 in which is arranged a control valve 26 within convenient reach of the operator. The pipe 25 extends upwardly and passes through the body frame 5 at a position contiguous to the top 7, as shown in Figure 2. The pipe line 25 then extends exteriorly and horizontally of the windshield and enters a T shaped fitting 27, which is stationarily carried by the pipe line 25 and in which the sleeve 14 closely fits but is free to revolve. It will be observed, by reference to Figures 3 and 4, that the sleeve is perforated as at 28. This is done in order that the heated gases passing through the pipe line 25 may then enter the sleeve 14, flowing through said sleeve and into a perforated conduit 29. This conduit is carried by the down-turned end 16 of the sleeve 14 and extends parallel with and closely adjacent to the wiping element 20. It will be observed that both the wiping element and the perforated conduit 29 are carried by the sleeve 14 which, in turn, is directly connected with the operating shaft of the motor 9. In this way both the wiping element and the conduit 29 oscillate together and move across the outer surface of the panel 3. The conduit 29, as shown in Figure 6, is provided with a plurality of perforations 30 so disposed as to direct jets or streams of heated gases upon the exposed surface of the panel 3 to each side of the wiping element 20.

It will be observed that by bringing such heated gases into contact with the windshield any foreign accumulations such as snow, ice, sleet and the like will be reduced in temperature to an extent necessary to liquefy the same, or in other words to reduce the foreign materials to a condition where they may be removed from the windshield by the action of the wiping element 20, whether such liquids are in a truly liquid state or not.

In view of the foregoing it will be seen that the present invention provides a simple and practical attachment for motor vehicle windshields whereby such windshields may be maintained in a condition permitting of clear observation therethrough under practically all manner of weather conditions. Heretofore it has been very difficult to operate a motor vehicle in snow or sleet storms, due to the inability of conventional wiping devices to remove the foreign materials. The present invention provides efficient yet simple combinations of elements whereby the same may be secured without undue mechanical complications. It is within the range of the invention to supply the conduit 29 with heated gases obtained directly from the interior of the exhaust manifold 21, and this may be accomplished by extending the pipe line 25 into the interior of said manifold, as will be obvious. I have described the motor 9 as being electrically operated. It will be apparent that any other mechanical unit capable of oscillating the shaft 11 may be employed with equal facility. During periods of mild weather the conduit 29 may be removed altogether so as to be out of the way when not needed.

What is claimed is:

1. The combination with a windshield wiper having an oscillating shaft and a squeegee element connected for oscillation with said shaft in engagement with the transparent panel of the windshield, of a hollow T-shaped member positioned with its bore in axial alignment with said shaft, a sleeve member within the bore of said T-shaped member connected for oscillation with said shaft, a conduit connected with said sleeve member positioned adjacent and substantially parallel with said squeegee element, said conduit being formed with a plurality of perforations spaced longitudinally of the conduit and directed towards the panel of said windshield, and means connected to said T-shaped member for supplying heated fluid thereto whereby as the squeegee element is moving over said panel said conduit will move in unison therewith directing jets of the heated fluid over said windshield.

2. The combination with a windshield wiper having an oscillating shaft and a squeegee element carried for oscillation with said shaft in engagement with the transparent panel of a windshield, of a hollow member positioned with its bore in axial alignment with said shaft, a hollow rotatable member within the bore of said first named member connected with said shaft, said rotatable member being formed with a port in open communication with said body, a conduit connected for oscillation with said rotatable member positioned adjacent and substantially parallel with said squeegee element, said conduit being formed with a plurality of divergingly arranged perforations spaced longitudinally of the conduit and directed towards the panel of said windshield, and means connected to said hollow member for supplying heated fluid thereto.

In testimony whereof I affix my signature.

CARROLL T. STEVENS.